Aug. 27, 1963  G. H. CLEMENS  3,101,822
COMBINED ACCELERATOR AND BRAKE ASSEMBLY FOR VEHICLES
Filed Feb. 16, 1961  2 Sheets-Sheet 1
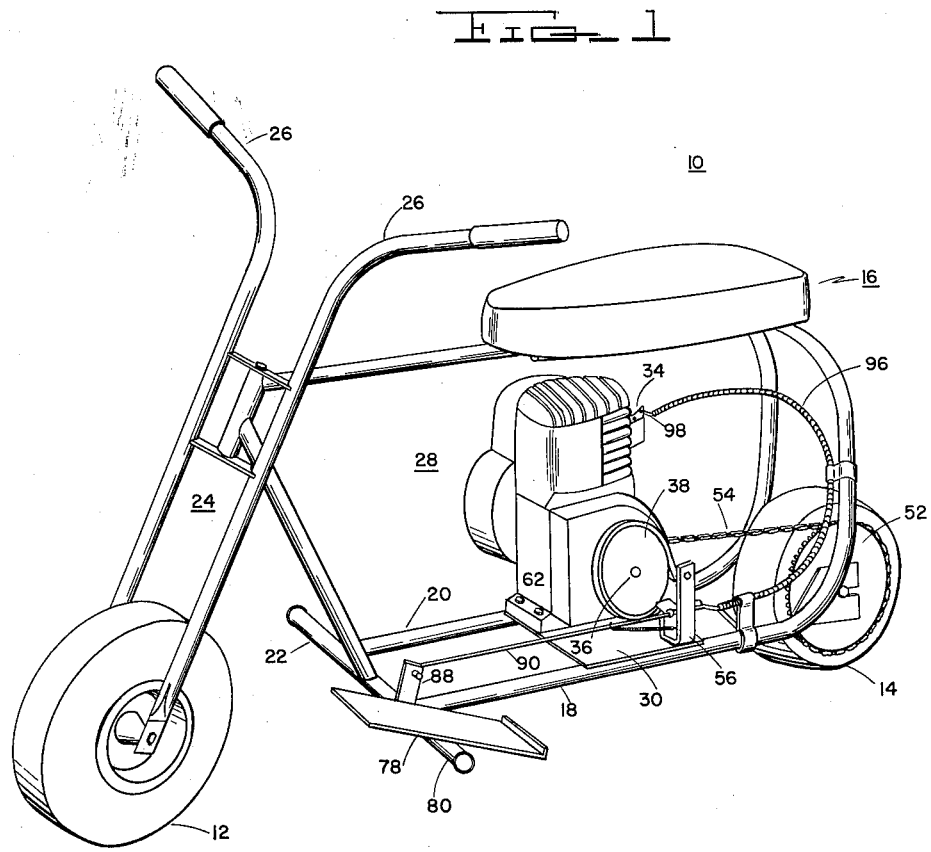
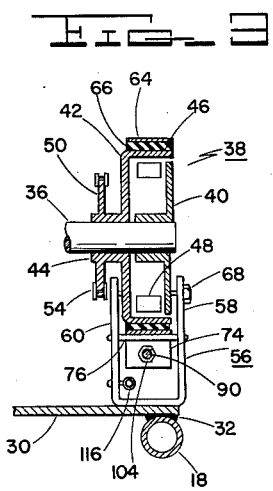
INVENTOR.
GLEN H. CLEMENS
BY *Gust & Irish*
ATTORNEYS Aug. 27, 1963 G. H. CLEMENS 3,101,822
COMBINED ACCELERATOR AND BRAKE ASSEMBLY FOR VEHICLES
Filed Feb. 16, 1961 2 Sheets-Sheet 2
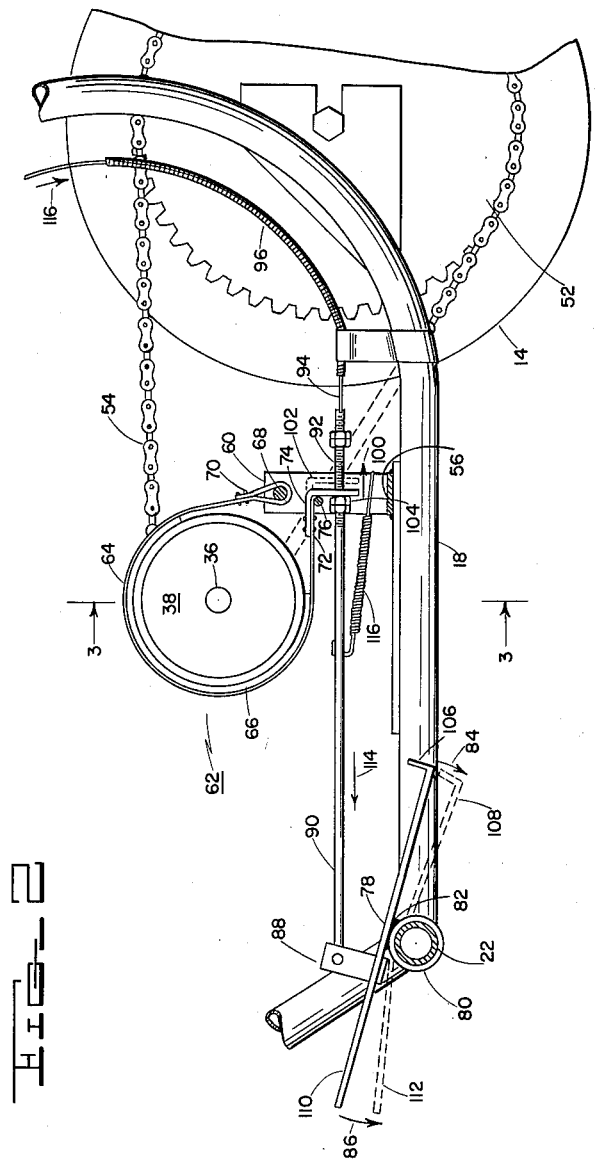
INVENTOR.
GLEN H. CLEMENS
BY *Gust & Irish*
ATTORNEYS

United States Patent Office 3,101,822
Patented Aug. 27, 1963

3,101,822
COMBINED ACCELERATOR AND BRAKE ASSEMBLY FOR VEHICLES
Glen H. Clemens, Fort Wayne, Ind., assignor to Glen H. Clemens, Inc., Fort Wayne, Ind., a corporation of Indiana
Filed Feb. 16, 1961, Ser. No. 89,838
6 Claims. (Cl. 192—1)

This invention relates generally to power driven vehicles, such as motor scooters, and more particularly to a combined clutch and brake arrangement for such vehicles.

Small self-propelled vehicles, such as motor scooters are conventionally driven by a small gasoline engine and, as a minimum, it is necessary that there be provided a clutch interconnecting the engine and the driving wheel or wheels, a throttle control or accelerator, and a brake; it has in the past been the practice to provide three separate operator-actuated controls for these three devices. It has been proposed to employ a speed-responsive or centrifical clutch thus eliminating a separate clutch control, however, to the best of the present applicant's knowledge, prior vehicles of the type under consideration have included both a brake actuating control and a throttle actuating control or accelerator. It is desirable that small self-propelled vehicles be characterized by their extreme simplicity and thus low cost and it is therefore desirable to provide a single operator control for actuating both the accelerator and the brake.

It is accordingly an object of my invention to provide a combined accelerator and brake assembly for prime mover-powered apparatus.

Further objects and advantages of my invention will become apparent by reference to the following description and the accompanying drawing, and the features of novelty which characterize my invention will be pointed out with particularity in the claims annexed to and forming a part of this application.

In accordance with the broader aspects of my invention, a prime mover is provided having speed control means movable between high and low speed positions and having a rotatable power shaft extending therefrom. Clutch means are provided having driving means secured to the shaft and a driven drum coaxially surrounding the driving means. Means such as a chain sprocket or pulley are provided secured to the drum for transmitting power therefrom. The unitary accelerator and brake means of my invention comprises a brake band embracing the drum, the brake band having one end movable between first and second positions thereby respectively to cause said band to disengage and engage the drum. Actuator means are provided movable between first and second positions, the actuator means being coupled to the speed control means of the prime mover for moving the same between the high and low speed positions responsive to movement of the actuator means from its first position toward its second position, the actuator means having means thereon which engages the end of the brake band and moves the same to its second position thereby causing the same to engage the drum responsive to movement of the actuator means to its second position.

In the drawings:
FIG. 1 is a view in perspective showing a motor scooter incorporating my invention;
FIG. 2 is a fragmentary side elevational view, partly in section, further illustrating the combined accelerator and brake assembly of my invention; and
FIG. 3 is a cross-sectional view taken along the line 3—3 of FIG. 2.

Referring now to the figures of the drawing, there is shown a motor scooter, generally identified at 10, having a front wheel 12 and a rear driving wheel 14. A frame 16 is provided having a pair of transversely spaced tubular elements 18 and 20 joined at their forward ends to a transverse member 22 and rotatably supporting rear wheel 14 as shown. Front wheel 12 is supported by a conventional fork assembly 24 which terminates in a pair of steering handles 26.

The prime mover for the motor scooter 10 is a small conventional gasoline engine 28 secured to and supported on a metal plate 30 which extends transversely across the frame elements 18 and 20 and which is respectively secured thereto in any suitable manner, as by welding as seen at 32 in FIG. 3.

Engine 28 has a conventional throttle lever 34 which is movable between high and low speed positions and has a power shaft 36 extending therefrom. A centrificial clutch assembly 38 is provided having a driving element 40 secured to the power shaft 36 and rotatable therewith. A driven drum 42 is provided having a hub portion 44 rotatably mounted on shaft 36 and an outer peripheral drum surface 46 coaxial with shaft 36 and driving element 40. Suitable centrifical elements 48 are interposed between the driving element 40 and the drum surface 46 and serve drivingly to interconnect the driving element 40 and the driven drum 42 at a predetermined speed of the power shaft 36. It will be readily understood that the centrifical clutch 38 is not my invention, such clutches being commercially available; a suitable centrifugal clutch assembly is shown in Patent No. 2,703,163. A driving sprocket 50 is secured to hub portion 44 of driven drum 42 and is connected to sprocket 52 on driving wheel 14 by drive chain 54.

In accordance with my invention, I provide a generally U-shaped bracket 56 secured to base plate 30 and in any suitable manner, as by welding, with its legs 58 and 60 extending upwardly therefrom somewhat rearwardly from clutch assembly 38. As best seen in FIG. 3, the spacing between legs 58 and 60 of bracket 56 is slightly greater than the width of clutch assembly 38 and the bracket is positioned so that the clutch 38 is in axial alignment therewith.

A brake band assembly 62 is provided comprising an outer band 64 formed of suitable flat spring steel and an inner band 66 formed of suitable brake lining material and secured to the inner surface of the outer band 64. A stud 68 extends through suitable openings in legs 68 and 60 of bracket 56 and end 70 of outer band 64 is secured thereto, as shown. The other end 72 of the outer brake band 64 has an angle bracket 74 secured thereto which extends into the space between bracket legs 58 and 60, as best seen in FIG. 2. It will now be seen that the brake band assembly partially surrounds or embraces the outer peripheral surface of driven drum 42 of the clutch assembly 38 and it will be understood that the resilience of outer band 64 tends to move bracket 74 toward the left, as viewed in FIG. 2, thereby to cause the inner brake band 66 to be disengaged from outer peripheral surface 46 of clutch drum 42. This movement of the brake band assembly 62 in the drum-disengaging direction is limited by a pin 76 extending between bracket legs 58 and 60 thus establishing a first or disengaged position for the brake band assembly 62.

An accelerator and brake pedal 78 is provided secured intermediate its ends to a suitable sleeve 80 in any suitable manner, as by welding, as at 82, sleeve 80 in turn being journaled on the portion of frame element 22 which extends outwardly beyond frame element 18. It will thus be seen that the pedal 78 is mounted for pivotal movement in directions shown by arrows 84 and 86. A lever member 88 is secured to the pedal 78 and an actuator rod 90 is provided having one end operatively connected to lever member 88, as shown. Actuator rod 90 extends axially from lever member 88 with its end 92 movably extending through a clearance hole in the angle bracket 74. One end of the inner control rod 94 of a flexible control cable 96 is attached to end 92 of actuator rod 90 and its other end 98 is connected to the throttle lever 34 of engine 28.

It will now be readily seen that if the angle bracket 74 of brake band assembly 62 is moved from its first or disengaged position, as shown in solid lines in FIG. 2, in the direction shown by the arrow 100 to a second position as shown in dashed lines 102, the inner brake band 66 will be caused frictionally to engage the outer peripheral surface 46 of clutch drum 42 thereby applying braking force thereto and in turn braking rear wheel 14. The end 92 of actuator rod 90 is threaded, as shown, and a pair of nuts 104 thereon serve as an abutment for engaging angle bracket 74 and moving the same to its braking position 102 responsive to movement of actuator rod 90 in direction 100, in turn responsive to downward movement of the rear end 106 of pedal 78 in the direction shown by the arrow 84 to a braking position as shown in dashed lines 108.

The position of pedal 78, actuator rod 90 and angle bracket 74 of brake band assembly 62 shown in solid lines in FIG. 2 is referred to as a "neutral" position in which throttle lever 34 of engine 28 has been moved to its low speed position. Movement of pedal 78 to its position shown by the dashed lines 103 thus moves actuating rod 90 in the direction shown by the arrow 100 and in turn moves angle bracket 74 to its position 102 thereby applying braking force to the driven drum 42, but not effecting throttle lever 34; it will be readily comprehended that the axial movement of angle bracket 74 in order to effect braking engagement of inner brake band 66 with the peripheral surface 46 of driven drum 42 need only be on the order of one quarter inch (¼"). When brake pedal 78 is returned to its neutral position as shown in solid lines in FIG. 2, the resilience of outer brake band 64 returns angle bracket 74 to its first position in engagement with pin 76 thus releasing the braking engagement of the inner band 66 with the driven drum 42.

Pivotal movement of end 110 of pedal 78 in the direction shown by the arrow 86 to the position shown in dashed lines 112 in FIG. 2 results in axial movement of actuator rod 90 in the direction shown by the arrow 114, end 92 of actuator rod 90 moving freely within the clearance opening in angle bracket 74 thereby moving the inner wire 94 of flexible cable 96 in the direction shown by the arrow 160 to actuate throttle lever 34 of engine 28 toward its high speed position. A suitable spring 116 is provided connecting actuating rod 90 and leg 60 of bracket 56 and biasing actuating rod 90 and pedal 78 toward the neutral position as shown in solid lines in FIG. 2, in which the brake band assembly 62 is disengaged from drum 42 of clutch 38 with throttle lever 34 of engine 28 being in its low speed position.

It will now be seen that movement of pedal 78 between its position shown in solid lines in FIG. 2 and its position shown in dashed lines 112 results in movement of throttle lever 34 of engine 38 between its low and high speed positions, while movement of the pedal 78 between its neutral position as shown in solid lines in FIG. 2 and its position shown in dashed lines 108 results in application of braking force to driven drum 42 of clutch 38 which in turn applies braking force to the driving wheel 14 through the intermediary of sprocket 50, chain 54 and sprocket 52. It will thus be seen that I have provided an arrangement in which a single operator-controlled pedal serves both as an accelerator and brake control for a small self-propelled vehicle such as the motor scooter shown. It will further readily be seen that while the motor scooter of FIG. 1 is extremely simple in its construction and thus of low cost, a large area braking surface is provided by virtue of the cooperation of brake band assembly 62 with the driven drum 42 of clutch assembly 38 and thus, my combination of the braking and accelerator control is accomplished without any sacrifice in braking effort, but on the contrary with a substantial improvement in braking over prior arrangements known to the present applicant involving direct braking of the rear wheel 14.

While I have illustrated and described a specific embodiment of my invention, further modifications and improvements will become apparent to those skilled in the art and I desire therefore in the appended claims to cover all modifications which do not depart from the spirit and scope of my invention.

What is claimed is:

1. In combination: a prime mover having speed control means movable between high and low speed positions and a rotatable power shaft extending therefrom; clutch means having driving means secured to said shaft and a driven drum coaxially surrounding said driving means; means for transmitting power from said drum; and unitary accelerator and brake means comprising a brake band embracing said drum, said brake band having one end movable between first and second positions thereby respectively to cause said band to disengage and engage said drum, and actuator means movable between first and second positions, said actuator means being coupled to said speed control means for moving the same between said high and low speed position responsive to movement of said actuator means from said first position toward said second position, said actuator means having means thereon which engages said end of said brake band and moves the same to said second position thereof thereby causing the same to engage said drum responsive to movement of said actuator means to said second position thereof.

2. In combination: a prime mover having speed control means movable between high and low speed positions and a rotatable power shaft extending therefrom; speed responsive clutch means having driving means secured to said shaft and a driven drum coaxially surrounding said driving means and shaft; power transmission means secured to said drum; and unitary accelerator and brake means comprising a brake band surrounding a portion of the peripheral surface of said drum, said brake band having one end fixed and its other end movable between a first position in which said brake band is disengaged from said drum surface and a second position in which said brake band engages said drum surface thereby to apply braking force to said drum, actuator means movable between first and second positions through a neutral position, and means operatively connecting said actuator means to said speed control means for moving the same between said high and low speed positions responsive to movement of said actuator means between said first and neutral positions thereof, said actuator means having abutment means thereon which engages said other end of said brake band and moves the same to said second position thereof thereby causing the same to engage said drum surface responsive to movement of said actuator means from said neutral position to said second position.

3. The combination of claim 2 wherein said brake band includes a member formed of spring material normally biasing said brake band to said first position thereof.

4. The combination of claim 3 further comprising means normally biasing said actuator means to said neutral position thereof.

5. In combination: a prime mover having speed control means movable between high and low speed positions and a rotatable power shaft extending therefrom; speed responsive clutch means having driving means secured to said shaft and a driven drum coaxially surrounding said driving means and shaft; power transmission means secured to said drum; and unitary accelerator and brake means comprising a brake band surrounding a portion of the peripheral surface of said drum, said brake band having one end fixed and its other end movable between a first position in which said brake band is disengaged from said drum surface and a second position in which said brake band engages said drum surface thereby to apply braking force to said drum, a manually actuated pivotally mounted brake and accelerator lever member pivotally movable between first and second positions through a neutral position, an actuator rod having one end operatively connected to said lever member and axially movable thereby, the other end of said rod movably extending through an opening in said other end of said brake band, means operatively connecting the other end of said rod to said speed control means for moving the same between said high and low speed positions responsive to movement of said lever member between said first and neutral positions thereof, abutment means on said rod engageable with said other end of said brake band in said neutral position of said lever member and moving said other end of said brake band between said first and second positions thereof responsive to movement of said lever member between said neutral and second positions thereby causing said brake band to engage said drum surface, said brake band including an element formed of spring material normally biasing said brake band to said first position thereof, and spring means normally biasing said rod so that said lever member is in its neutral position.

6. In combination: a frame; a prime mover mounted on said frame and having speed control means movable between high and low speed positions and a rotatable power shaft extending therefrom; a centrifugal clutch having a driving element secured to said shaft, a driven drum having a cylindrical peripheral surface coaxially surrounding said shaft and driven element, and centrifugal means disposed between said driving element and drum and connecting the same responsive to a predetermined speed of said power shaft; power transmission means secured to said drum and rotatable therewith; a brake band assembly comprising an outer band formed of flat spring material with an inner band of friction material secured to one surface thereof, the ends of said outer band extending respectively beyond the ends of said inner band, said brake band assembly surrounding a portion of the peripheral surface of said drum with said inner band facing the same; a U-shaped bracket member secured to said frame; a stud secured to the legs of said bracket member and extending thereacross with one end of said outer band being secured thereto; the other end of said outer band being formed at generally right angles thereto and extending between said bracket member legs, said other end of said outer band being axially movable between a first position in which said inner band is disengaged from said peripheral surface of said drum and a second position in which said inner band engages said drum surface thereby to brake the same, said outer band resiliently biasing said other end to said first position thereof; another stud secured to the legs of said bracket member and extending thereacross and engaging said other end of said outer band in said first position thereof; a manually actuated brake and accelerator lever pivotally mounted on said frame and pivotally movable between first and second positions through a neutral position; an actuator rod having one end operatively connected to said lever and axially movable thereby, the other end of said rod movably extending through a clearance opening in said other end of said outer band and between said bracket member legs; means operatively connecting the other end of said rod to said speed control means for moving the same between said high and low speed positions responsive to movement of said lever between said first and neutral positions thereof, abutment means on said rod engageable with said other end of said outer band in said neutral position of said lever and moving said other end of said outer band to said second position thereof responsive to movement of said lever from said neutral position to said second position thereby causing said inner band to engage said drum surface; and spring means connected to said rod for biasing the same so that said lever is in its neutral position.

References Cited in the file of this patent

UNITED STATES PATENTS

| 2,051,375 | Harrison | Aug. 18, 1936 |
| 2,102,755 | Sinclair | Dec. 21, 1937 |
| 2,445,058 | Fields | July 13, 1948 |
| 2,476,058 | Mertz | July 12, 1949 |